UNITED STATES PATENT OFFICE.

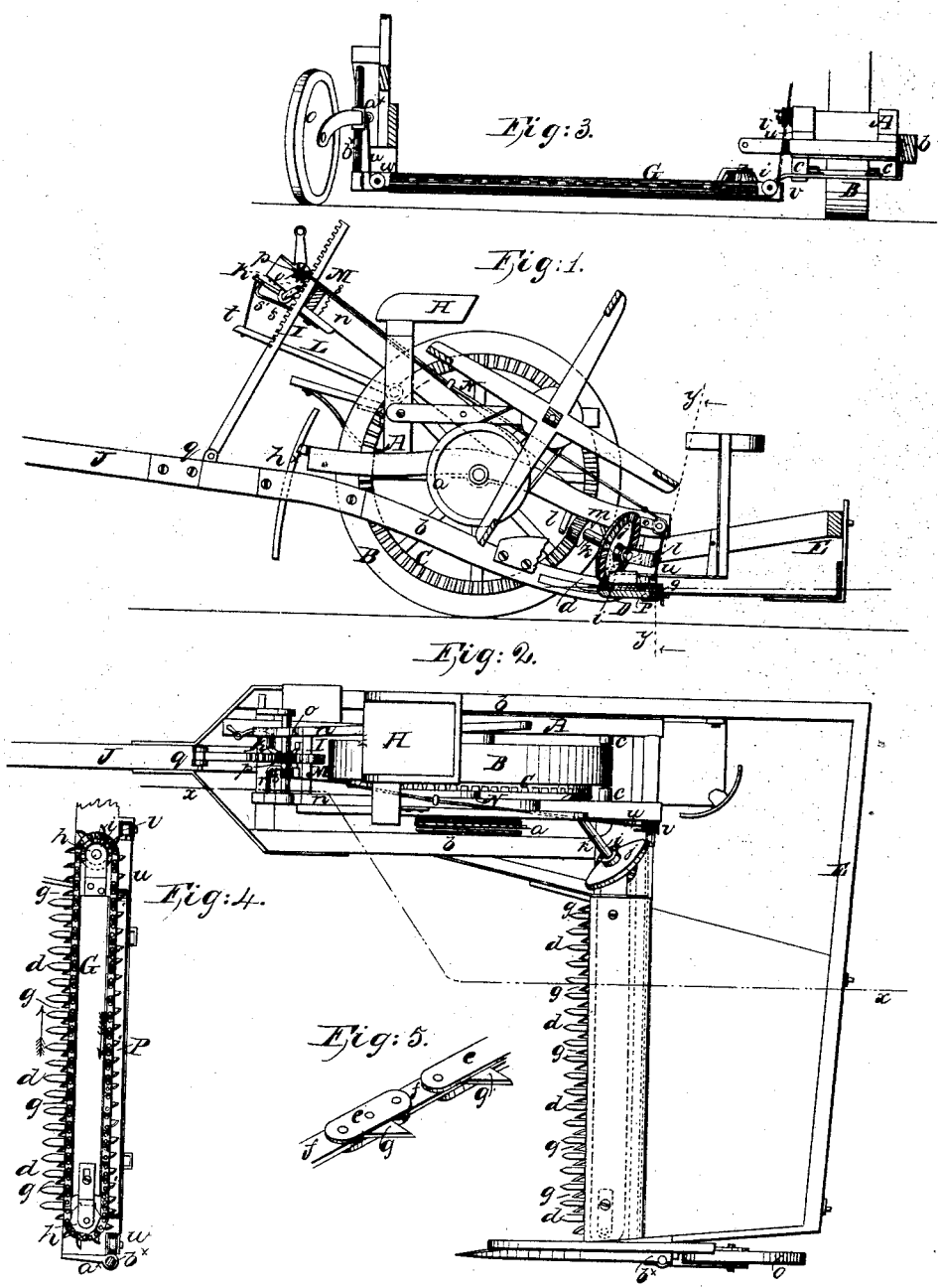

SAMUEL BUSER AND JOHN H. BUSER, OF WARREN, ILLINOIS.

IMPROVEMENT IN HARVESTERS.

Specification forming part of Letters Patent No. 27,105, dated February 14, 1860.

*To all whom it may concern:*

Be it known that we, S. BUSER and J. H. BUSER, both of Warren, in the county of Jo Daviess and State of Illinois, have invented certain new and useful Improvements in Grain and Grass Harvesters; and we do hereby declare that the following is a full, clear, and exact description of the same, reference being had to the annexed drawings, making a part of this specification, in which—

Figure 1 is a side sectional view of our invention, taken in the line $x\,x$, Fig. 2. Fig. 2 is a plan or top view of the same. Fig. 3 is a sectional view of the same, taken in the line $y\,y$, Fig. 1, and looking in the direction indicated by the arrows. Fig. 4 is a detached plan view of the cutting device. Fig. 5 is a detached perspective view of a portion of the sickle.

Similar letters of reference indicate corresponding parts in the several figures.

To enable those skilled in the art to fully understand and construct our invention, we will proceed to describe it.

A represents the main frame of the machine, in which the driving-wheel B is placed, said wheel having a geared rim, C, on its inner side. The axle of the wheel B extends through the frame A, and has a pulley, $a$, on its inner end. The main frame A is fitted within hounds $b\,b$, which are attached one to the finger-bar D and the other to one end of the frame E, which supports the platform. (See Fig. 2.) The main frame A is attached at its back end to the platform-frame E by hinges or joints $c\,c$. The finger-bar D is at the front end of the platform-frame E, as usual, and the fingers $d$ are of the usual form. On the upper surface of the finger-bar F an endless chain of cutters, G′, is placed. This chain is formed of links $e\,f$, the links $e$ being slotted or formed of two plates connected by rivets, and receiving the ends of the links $f$ and the cutters $g$, the latter being permanently secured in the links $e$. (See more particularly Fig. 5.) The chain G works around polygonal wheels $h\,h$, at the ends of the finger-bar, and the cutters $g$ project over the front edge of the finger-bar and work through the slots in the fingers $d$. One of the wheels $h$ is held in an adjustable holder attached to the finger-bar. By adjusting the holder by means of a set-screw the cutter may be loosened or tightened. The cutters have an oblique cutting-edge, as shown clearly in Fig. 5, and the innermost chain-wheel $h$ has a bevel-pinion, $i$, attached to its upper surface, into which a wheel, $j$, gears, the latter being on a shaft, $k$, which has its bearings $l$ attached to the main frame A, as shown clearly in Fig. 1. On the shaft $k$ a pinion, $m$, is placed, which pinion gears into the rim C.

On the main frame A the driver's seat H is secured, and at the front part of the inclined bars $n\,n$ on the main frame a shaft, $o$, is placed, said shaft having a pinion, $p$, placed on it, which pinion gears into a rack, I, the lower end of which is attached by a joint, $q$, to the back part of the draft-pole J, near its junction with the hounds $b\,b$, as shown clearly in Figs. 1 and 2. To the under sides of the inclined bars $n\,n$, just below the shaft $o$, a stop, K, is secured, said stop being formed of a shaft, $r$, having a loop or crank-like projection, $s$, formed on it, which is retained in the rack I by a spring, $s'$, to which a treadle, L, is attached by a rod, $t$. (See Fig. 1.)

To the shaft $o$ a chain, M, is attached, to which a rod, N, is secured. This rod N extends along the main frame A, and has a chain, $u$, attached to its back end, said chain passing around guide-pulleys $v\,v$ and then along the back part of the finger-bar and around a guide-pulley, $w$, to a socket, $a^\times$, which is fitted loosely on a vertical rod, $b^\times$, and has a supporting-wheel, O, attached to it. (See Fig. 3.)

On the back part of the upper surface of the finger-bar F a plate, P, is attached. This plate may be of steel, iron, or other substance, and forms a bearing and sharpening surface for the cutters $d$, the under smooth surfaces of the cutters bearing on the plate P as they pass around the backs of the wheels $h\,h$.

To the back part of the draft-pole J a segment-guide, $h^\times$, is attached, said guide fitting in a notched plate on the front part of the main frame, and serving as a guide for the same as it is raised and lowered.

The operation is as follows: As the machine is drawn along a continuous motion is given the endless chain of cutters G by means of the gearing C $m\,j\,i$, and the grass or grain is cut as the cutters $g$ pass through the slotted fingers $d$, the cutters being kept in good working order by the plate P, which serves as a sharpening device. The cutting device may be regulated at the desired height from the surface of the ground by turning the shaft $o$ and elevating the front part of the main frame A; and it will be seen that, owing to the connection of the wheel O with the shaft $o$ by means of the chains M $u$ and rod N, the outer end of the frame E will be elevated and depressed simultaneously with the inner end, and the cutting device retained in a horizontal position at all times and the sickle allowed to be readily raised to pass over any obstructions that may be in its path.

Having thus described our invention, what we claim as new, and desire to secure by Letters Patent, is—

The combination of the frames A E, hinged at $c$ $c$, with the elevating devices—viz., the rack-bar I, shaft $o$, chain M $n$, and sliding caster-wheel O—arranged to operate in the manner and for the purpose herein shown and described.

SAMUEL BUSER.
JOHN H. BUSER.

Witnesses:
JOHN D. PLATT,
P. H. DOBLER.